March 16, 1965  I. M. LEFTON ETAL  3,173,866
APPARATUS FOR THE TREATMENT OF SEWAGE
Filed March 28, 1962  4 Sheets-Sheet 1

Inventors
Irvin M. Lefton
Randal L. Garter
BY
Olson, Mecklenburger, von Holst,
Pendleton & Neuman Attys Inventors
Irvin M. Lefton
Randal L. Garter
BY
Olson, Mecklenburger, von Holst,
Pendleton & Neuman Attys

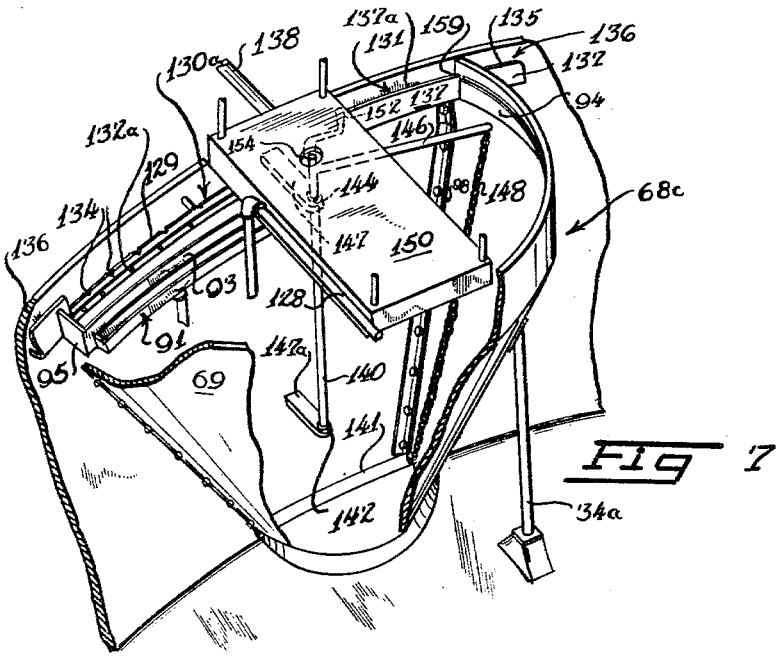

United States Patent Office 3,173,866
Patented Mar. 16, 1965

3,173,866
APPARATUS FOR THE TREATMENT OF SEWAGE
Irvin M. Lefton, Leawood, Kans., and Randal L. Garten, Liberty, Mo., assignors to Pritchard Products Corporation, a corporation of California
Filed Mar. 28, 1962, Ser. No. 183,095
5 Claims. (Cl. 210—205)

The invention relates to the treatment of sewage, and more particularly pertains to apparatus for continuously aerating sewage over an extended period of time, and a method for using such apparatus.

Lack of sewage disposal facilities is recognized as a primary factor which has heretofore prevented the development of extensive tracts of vacant land, although such land lies adjacent thriving metropolitan centers which have crowded, inadequate housing. The inability to develop such land creates a paradoxical situation. While the small number of persons usually living on such tracts is normally insufficient to supply the necessary funds to construct adequate sewage facilities, adequate sewage facilities must exist before a sufficiently large number of taxpaying inhabitants will be attracted.

Sewage treating plants of the type hereinafter to be described enable the much-needed land to be gradually developed as the population increases. The apparatus of this invention may be installed in from three to four months and may be scaled to serve communities numbering between 150 and 10,000 homes. Despite these desirable characteristics, the treating apparatus to be described requires less initial capital and operating costs per individual served than any other apparatus employed for the aerobic digestion of sewage. Also, although such apparatus is particularly adapted for the treatment of domestic sewage, industrial wastes which are biologically oxidizable may also be treated either exclusively or in combination with domestic sewage.

The apparatus to be described employs means for aerating liquid sewage normally containing about one-tenth of one percent solids in an aeration basin by continuous mechanical agitation. The generation of large quantities of bacterial protoplasm and concomitant aerobic digestion of the organic content in the sewage resulting from the aeration produce a flocculent material. The latter material and other solids are settled out in clarification chambers disposed in the aeration basin, eventually compacted into sludge and withdrawn from the apparatus.

Prior to discharge from the system in the form of sludge, the floc is recycled between the clarification chambers and the aeration basin and retained in fine particle form in the mixed liquor, which also contains incoming raw sewage and other suspended solids. A liquid effluent is also discharged from the apparatus of this invention having a low biochemical oxygen demand (chemical measure of the deoxygenating power), which is primarily caused by active microbial masses discharged in the effluent. In addition, the provided apparatus is substantially automatic in operation for extended periods of time under normal operating conditions.

Although the combination of an aeration basin with clarification chambers has been employed in the past for sewage treating purposes, the unique compact arrangement of such components in the apparatus of this invention enables a novel method of sludge separation to be carried out, in addition to providing positive sludge control at all times during the treatment.

It is an object of this invention to provide a sewage treating apparatus in which the raw sewage to be treated is admixed and diluted with a large volume of mixed liquor containing active aerobic microbial masses. As a result, the effects on the treating process caused by fluctuations in the rate of the raw sewage flow are minimized.

It is another object of this invention to provide apparatus for the efficient treatment of sewage which requires a small initial capital expenditure, has low operating costs and may be installed in a minimum amount of time.

It is another object of this invention to provide sewage treating apparatus which is flexible in operation enabling the formed sludge to be positively controlled at all times during the treating process.

It is a further object of this invention to provide sewage treating apparatus which may be used in separate stages in accordance with the quantity of sewage treated, as will hereinafter be explained in greater detail.

It is a still further object of this invention to provide a method for treating sewage in which the separation between the lighter floc, resulting from aerobic digestion of the sewage organic content, and the heavier organic material of the raw sewage is facilitated by means of a novel clarification chamber arrangement disposed within a main aeration basin, as will also hereinafter be explained in greater detail.

It is another object of this invention to provide apparatus for the treatment of sewage which is substantially automatic in operation requiring only periodic checking by an attendant.

The above and other objects of this invention will become more apparent from the following detailed description when read in the light of the accompanying drawings and appended claims.

In one embodiment of this invention a main aeration basin for reception of raw sewage, after comminution or screening, is provided having an aerator substantially centrally disposed therein. The aerator, in the course of forcing quantities of atmospheric oxygen to dissolve in the liquid sewage, continuously circulates the same from top to bottom in addition to rotating the sewage about the aerator as a center. A plurality of clarification chambers is spaced about the perimeter of the aeration basin. Each chamber is provided with a closable opening in the lee side of the chamber wall out of direct contact with the sewage current developed by the aerator.

As a result of supplying atmospheric oxygen to the raw sewage, flocs teeming with living aerobic microbes comprising various bacteria, fungi, etc. are generated. These organisms have their origin in the sewage itself and rapidly increase in the presence of the oxygen and the organic content of the sewage which serves as food. These aerobic microbes are able to assimilate colloidal, dissolved or suspended organic material, although a certain percentage of the volatile suspended solids in raw sewage is nonbiologically oxidizable. The flocs are maintained aerobic by continuous contact with the atmospheric oxygen and continuous circulation within the aeration basin. Oxygen may also be dissolved in the sewage solution by diffusing compressed air throughout the sewage by means of perforated conduits. The expense occasioned in diffusing air into the solution is usually greater than that entailed when mechanical aeration is employed. A combination of mechanical agitation and diffusion means may also be used to supply the necessary oxygen to the sewage to support aerobic digestion.

In the course of circulating or swirling about the aeration basin as a result of the current generated by the aerator, a portion of the mixed liquor within the aeration basin flows into the clarification chamber openings. Since the openings are disposed in the lee side of each of the chamber walls, the light floc more readily enters in opposition to the aerator-created current than the more positively driven, and heavier, undigested organic material in the raw sewage. The floc is allowed to settle and compact into sludge in the clarification chamber in the course of gravitating to the bottom. A pump continuously recycles the sludge formed on the bottom of the chamber back into the aeration basin.

When the suspended solids in the solution being aerated reach a certain level, as may be readily ascertained by well known quantitative analysis procedures, the sludge contents in the bottom of the clarification chamber may be pumped to the exterior of the aeration basin to a tank truck or other means for conveying the sludge to a disposal site. Since the removed sludge solids are normally at least ninety percent inert, further stabilization of the sludge by aerobic or anaerobic digestion is not warranted. The solids may be dewatered on a sand drying bed, spread over loose soil or disposed of in other desired manner.

A launder section having a weir plate with a notched edge disposed at the liquid level is disposed in each clarification chamber and continuously receives the upper layer of the chamber contents from which the suspended floc particles have settled. The effluent is conveyed to a fluid outlet which preferably discharges the clarified liquid effluent having a small biochemical oxygen demand into a stream or other body of water.

For a more complete understanding of this invention, reference will now be made to the drawings wherein:

FIG. 7 is a fragmentary perspective view, partially broken away, illustrating a clarification chamber employing a floc-removal device, which will hereinafter be described in greater detail;

FIG. 8 is a fragmentary perspective view illustrating the launder arrangement in one of the clarification chambers of the provided apparatus; and FIG. 9 is a fragmentary perspective view illustrating a weir arrangement in an effluent-receiving launder section.

*Aeration basin*

Figure 1:
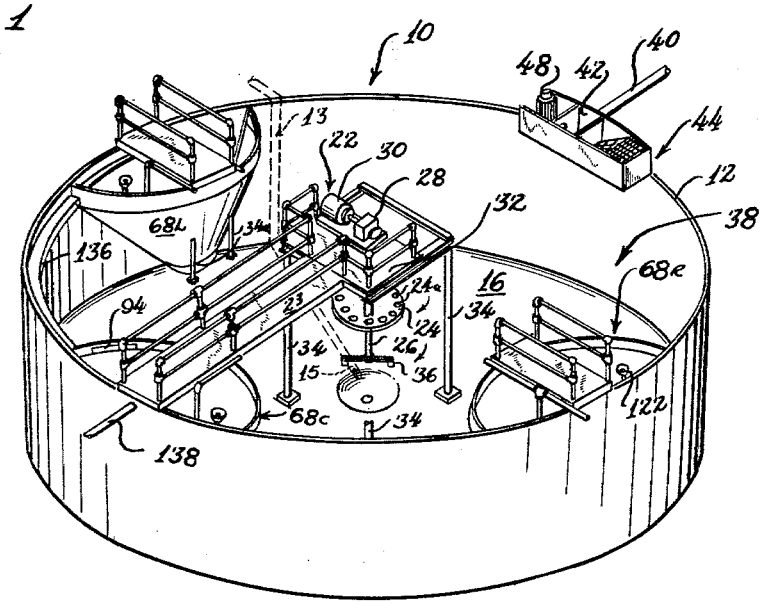
FIGURE 1 is a fragmentary perspective view, partially broken away, of one form of sewage treating apparatus adapted to continuously aerate sewage for an extended period of time, formed in accordance with the teaching of this invention.

Referring now more particularly to FIG. 1, a sewage treating installation 10 is illustrated which enables a process to be carried out wherein raw sewage having an organic content which is biologically oxidizable is continuously aerated for an extended period of time. A twenty-four hour aeration period has produced satisfactory results, and since it also is a convenient figure to use in apparatus design, it has been established as the proper aeration period in apparatus of the type to be described. It has been estimated that in 3.4 hours approximately ninety percent of the oxidizable organic matter in domestic sewage will be biologically metabolized and about ninety-eight percent will be metabolized in 18.4 hours. As a result of the extended aeration, organic components of the sewage are digested by aerobic microbes producing water, carbon dioxide and a flocculent material consisting of organic residue and live and dead microbial masses. The organic residue also referred to as "ash" is inert having no biochemical oxygen demand.

In FIG. 1 a main shell or wall 12 defining the perimeter of an aeration basin 38 is illustrated. The wall may be composed of a plurality of curved metal sheets which have been welded together and coated with a rust and acid resistant substance, such as an epoxy resin coating. Such coating provides the metal wall 12 with a long useful life. It will be seen from FIG. 3 that the lower edge of the wall is set in an annular recess 14 of a concrete floor 16, which uniformly slopes toward a centrally located sump 18. After insertion of the wall sections in the groove 14 of the floor 16, the remainder of the groove is filled with grout 20. The wall 12 is preferably placed in an earthen excavation for reinforcing purposes and for minimizing the effects of reduced temperatures on the basin contents.

*Aerator assembly*

Substantially centrally disposed in the aeration basin 38 in an aerator assembly 22, which may be reached by means of a bridge 23. The assembly 22 includes an upper rotor plate 24, mounted on a rotatable shaft 26. Plate 24 has a plurality of spaced apertures 24a (see FIG. 1) disposed about its outer perimeter which are arranged behind blades 24b (see FIG. 3) with respect to the direction of rotation; such rotor plates are well known in the sewage-treating art. Shaft 26 depends in turn from a gear box 28, the gears of which are driven by motor 30. The aforementioned aerator assembly elements are supported on a central platform 32 which is maintained in a desired elevated position relative to the floor 16 by means of four supporting posts 34. An auxiliary rotor 36 may be employed to assist the action of plate 24, as is more clearly seen from FIG. 3.

The rotors 24 and 36 create a continuous pumping action whereby the fluid contents of the aeration basin 38 are pulled from the bottom of the basin and moved outwardly in all directions, forcing the same to flow along the surface toward the confining wall 12. At the wall, the fluid contents are again picked up by the action of the rotors 24 and 36. As a concomitant of the latter pumping action, a clockwise, low velocity current is created, in addition to the above-described radial and vertical movement of the basin contents. Although the rotors 24 and 36 move clockwise, as indicated by the arrows in FIG. 1, they may be driven counterclockwise. The specific direction of the low velocity current is of some importance, as will hereinafter be made apparent, and is determined in advance of apparatus completion.

In the course of agitating the basin contents, a desired quantity of oxygen (depending upon the oxygen demand of the sewage) is dissolved with the assistance of the aerator assembly in the basin contents per unit time. The rotors of the aerator assembly thus have a two-fold purpose. They rapidly move the contents of basin 38 and also create a turbulence providing desired air-water interfaces so that maximum atmospheric oxygen transfer will be effected. A conduit 13, illustrated in dotted lines in FIG. 1, is apertured at a terminal end portion 15 and disposed beneath the overlying rotors. Conduit 13 may increase the oxygen transferred to the basin contents by conveying compressed air from a compressor, not illustrated, and diffusing the same into the sewage by means of end portions 15 thereof.

In the normal course of operation, raw sewage enters the aeration basin 38 by means of an influent line 40. Normal domestic sewage comprises approximately a one-tenth of one percent suspension of solids in water. However, the apparatus of this invention is designed to process both domestic and industrial wastes having a biochemical oxygen demand. Thus, industrial wastes having a large biologically-oxidizable organic content, such as wastes from food processing plants, etc., are adaptable for treatment by the apparatus of this invention.

Large quantities of certain industrial wastes, such as those having high or low pH conditions and in which aerobic microbes cannot survive, are not intended for treatment by the apparatus herein described.

*Sewage receiving assembly*

Figure 4:
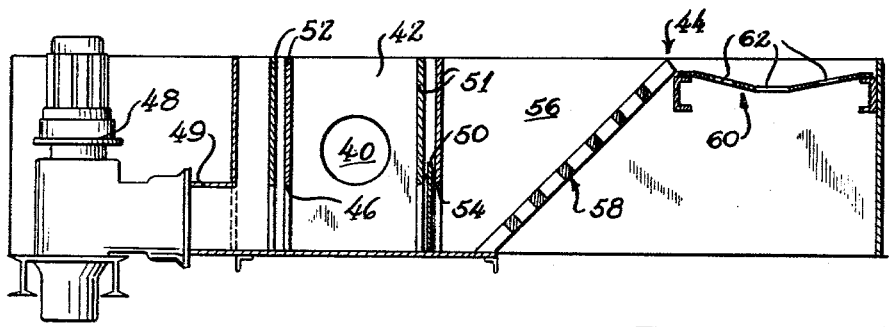
FIG. 4 is an enlarged transverse sectional view, partly in elevation, of apparatus for treating raw sewage prior to entry into the aeration basin of FIG. 1.

Raw sewage passing from the influent line 40 enters chamber 42 of a sewage receiving assembly 44, more clearly seen in FIG. 4. From chamber 42 the sewage may pass through an opening 46, communicating with a comminutor 48 by means of connector 49, after which the comminutor-processed sewage may be discharged directly downwardly into the aeration basin 38. Since the aerator assembly 22 rapidly and uniformly admixes the contents of basin 38, the precise location at which the raw sewage is discharged from receiving assembly 44 into the basin is immaterial.

If for any reason it is not desired to employ a comminutor 48, or in the event of comminutor breakdown, opening 46 may be closed by means of gate 50. Gate 50 may be received between guides 52, after removal from between guides 51 used in conjunction with opening 54, allowing passage of the raw sewage from the chamber 42 to proceed through opening 54 into screening chamber 56. Inclined bar screen 58 having openings of desired size is disposed in the latter chamber through which the incoming sewage must pass prior to flowing into the underlying basin 38.

The upper portion of bar screen 58 terminates adjacent a drain 60 having a plurality of slots 62 through which liquid may drain into the basin. An attendant may periodically rake the accumulated material retained by screen 58 onto the drain 60 from which the material may be removed periodically for disposal after the liquid content thereof has been substantially reduced by draining.

As a result of the action of comminutor 48, organic material in the incoming sewage may be divided into a desired particle size which will facilitate complete digestion of the same by aerobic microbes in the aeration basin. Both the comminutor and the screen serve to break up or remove large particles in the raw sewage which could interfere with subsequent sewage processing operations.

*Use of basin with waste stabilization pond*

If basin 38 is employed solely as an aeration tank, aeration of the incoming sewage will result in a biochemical oxygen demand reduction therein which increases with the length of aeration. Normally, however, the incoming sewage flow will force the mixed liquor from the basin before the biochemical oxygen demand therein is reduced to a desired low level. The resulting mixed liquor may be reduced to a desired level in biochemical oxygen demand by passing the same into an adjacent stabilization pond, wherein the original biochemical oxygen demand of the processed sewage may be further reduced as a result of further oxidation effected by means of a biophysical relationship within the pond.

Stabilization ponds are primarily intended for use in those localities having extended periods of favorable weather conditions wherein daily sunshine is normal. As a result of the sunlight, the algae within the pond generate oxygen by means of photosynthesis, which enables aerobic microbes present in the pond to effect further digestion of the unoxidized organic content of the mixed liquor flowing from the aeration basin 38. Consequently, as a result of the combined oxygen demand reduction effected in the aeration basin 38, plus that effected in an adjacent stabilization pond, a total reduction in biochemical oxygen demand of from eight-five to ninety-five percent may be effected. A sludge will deposit in the pond, and in the event that evaporation losses from the pond are relatively small, a liquid effluent may be drawn off and discharged into a stream or other receiving body of water wherein the remaining small biochemical oxygen demand will be eliminated. The ponds preferably are shallow and have a large surface area whereby action of the wind will stir the pond contents and a maximum amount of atmospheric oxygen may be entrained in the liquid.

The above-described functioning of the aeration basin 38 in combination with a stabilization pond is well known and may be employed in those areas where land is cheap and available for the formation of ponds and where, as previously mentioned, weather conditions are favorable so that algae may thrive during extended periods of sunlight. However, in those locations where land values are high and weather conditions unfavorable to the growth of algae, the use of a stabilization pond is rendered substantially impossible.

*Clarification chambers*

The compact sewage treating apparatus 10 illustrated in FIG. 1 is able to reduce the biochemical oxygen demand of raw sewage to the level effected by the combined action of an aeration tank and a stabilization pond, regardless of weather conditions. Although, basin 38 may be initially employed solely as an aeration basin, increased sewage flow may place such a heavy load on both the basin and the pond that their combined action is incapable of producing an effluent having a desired low biochemical oxygen demand. The desired reduction is made possible within the confines of wall 12 with the assistance of clarification chambers 68L, 68C and 68R disposed about the perimeter of aeration basin 38, as illustrated in FIG. 1. The specific number of clarification chambers may vary and the embodiment of FIG. 1 is presented by way of illustration only. A single chamber may be adequate for assisting in reducing the biochemical oxygen demand of treated sewage to a desired level.

It is the function of the clarification chambers to provide zones within the confines of the main basin wall 12, wherein the floc generated as a result of the aerobic digestion of the sewage, as well as other suspended solids in the aeration basin liquor, may be compacted to form a sludge which periodically may be discharged to a tank truck or equivalent means for removal to a disposal site. In addition to the floc resulting from the sewage digestion, there are also suspended in the aeration basin liquor, other solid particles, which are nonbiologically-oxidizable. As much as twenty percent of the volatile suspended solids in raw sewage may be nonbiologically-oxidizable. The bulk of the suspended solids in the aerator basin are compacted into sludge in the clarification chambers for removal from the system.

Figure 2:
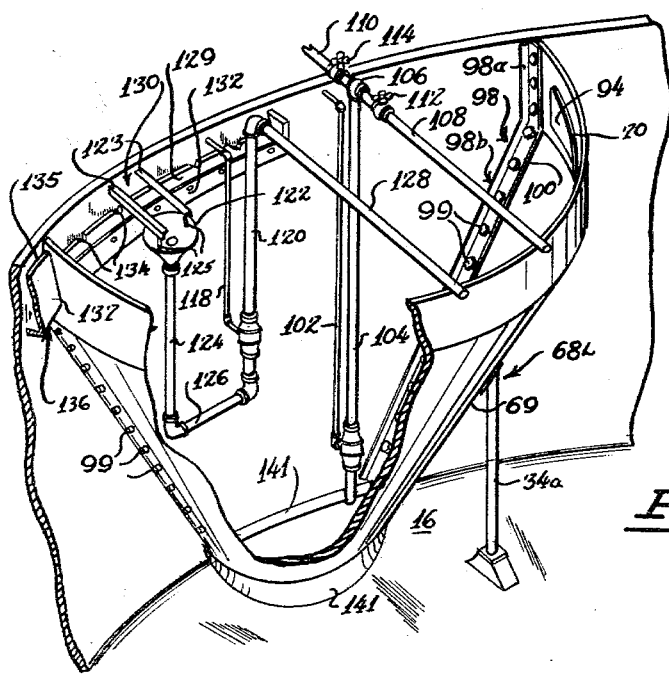
FIG. 2 is an enlarged fragmentary perspective view, partially broken away, illustrating the interior of a clarification chamber employed in the apparatus of FIG. 1.

Referring now more particularly to FIG. 2, clarification or settling chamber 68L is illustrated in detail depicting the manner whereby wall 69 thereof is secured to angle irons 98. Legs 34a may be employed to assist in supporting the walls in each of the clarification chambers. Angle irons 98 are spot-welded or otherwise suitably secured to surface portions of the aeration basin wall 12, which may also serve as wall portions for the clarification chambers. The angle iron portions projecting at right angles to the surface of the wall 12 are apertured at spaced intervals whereby nut and bolt assemblies 99, rivets or other equivalent securing means, may affix aperture portions of wall 69 of each clarification chamber to the angle irons. The angle irons 98 are formed to provide an upper vertical portion 98a and a lower portion 98b angularly disposed thereto to conform with the configuration of the terminal side edges of the chamber walls 69. It should be noted that the main structural details of chamber 68L are also found in chambers 68C and 68R with the exception of the launder sections, as will hereinafter be made apparent.

As above explained, the aeration basin 38 may be initially employed in conjunction with a stabilization pond without the use of the clarification chambers. It may be desirable at the time the basis wall 12 is first constructed to also secure the angle irons 98 at predetermined positions in expectation of the time when the sewage flow will increase and clarification chamber walls 69 will be incorporated in the aeration basin. A gasket member, such as a neoprene strip 100, may be employed between the secured ends of the chamber wall 69 and the angles 98. The gasket will provide a substantially fluid-tight seal between the clarification chamber contents and the mixed liquor in the aeration basin when the chamber walls are installed.

Figure 5:
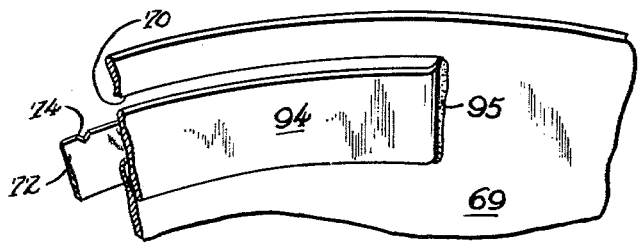
FIG. 5 is a fragmentary perspective view illustrating a baffle and weir arrangement employed in conjunction with wall openings disposed in the clarification chambers of the provided apparatus.

Disposed in the wall 69 of each of the clarification chambers, approximately at the normal basin liquid level is a slot-like opening 70, one of which is more clearly seen in FIGS. 5 and 8. Bolted to an outer chamber wall portion adjacent the slot opening is a weir 72 having a plurality of notches 74 formed at regular intervals in the upper edge thereof. The notches 74 traverse the liquid level within the aeration basin, as is more apparent from FIG. 6, wherein the liquid level is represented by arcuate line 76. The notches are intended to assist in maintaining an even flow into the clarification chambers and also assist in maintaining turbulence in the vicinity of the weir at a minimum. Also the entrance of large unoxidized sewage particles into the clarification chambers by means of openings 70 is minimized by said notches.

Figure 6:
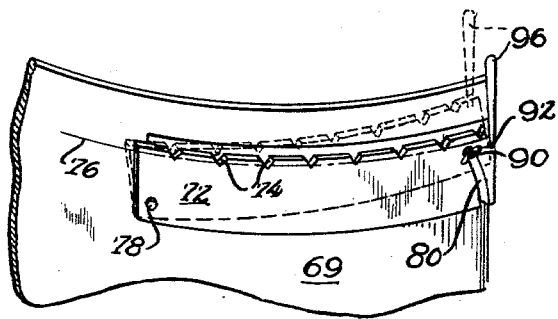
FIG. 6 is a fragmentary perspective view illustrating one form of weir which may be employed in the apparatus of this invention.

It will be further noted from FIG. 6 that the weir 72 may be pivotally mounted on a bolt 78 at one end portion and have a curved elongate slot 80 disposed in an opposed end portion, through which a stud 90 secured to a portion of clarification chamber wall 69 may project. A wing nut 92 may threadedly engage the stud 90 and fixedly lock weir 72 relative to wall 69 of the chamber. A resilient backing may be secured to the rear surface of each weir 72 to assure a fluid seal between the curved surfaces of the weir and chamber wall, regardless of the weir angular position.

It may at times be desirable to terminate flow of the mixed liquor from the aeration basin into a clarification chamber. It then becomes a simple matter to pivotally move the weir upwardly through a slight angle whereby slot 70, through which the mixed liquor normally passes into the clarification chamber, is sealed off from the basin liquor. The contents of the clarification chamber may then be removed so that maintenance or other desired operations may be performed on the inside of the clarification chamber without in any way affecting normal operation elsewhere in the aeration basin. The relationship between the weir 72 and slot opening 70 may also be regulated by forming vertical slots in opposed end portions of the weir, which may be employed with stud and nut assemblies similar to stud 90 and nut 92.

Since a plurality of clarification chambers will normally be employed, removing one of the chambers from operation will not greatly disturb the normal sewage processing since the remaining chambers will in most instances be able to handle the increased load placed upon them. Shutting down a clarification chamber during a period of low raw sewage flow will minimize the effect of chamber reduction.

Disposed rearwardly of weir 72 is a baffle 94 supported by wall 69, as at 95, as seen in FIG. 5. The baffle surface is substantially vertically disposed and depends below the chamber liquid level. Thus, mixed liquor entering each clarification chamber over the weir 72 cannot flow in a straight path after entering slot 70, and must flow under baffle 94. The baffle thus assists in the settling of the suspended solids contained in the mixed liquor. To facilitate pivotal movement of the weir 72, an upwardly projecting handle 96 is secured to the weir 72 at the end portion oppositely disposed to the pivot 78.

Air lift pumps

It will also be noted from FIG. 2 that an air lift pump, of conventional design comprising an air line 102 connected to a compressor (not shown) which enters a substantially vertically disposed sludge removal pipe 104 to provide an upwardly directed jet of compressed air therein is disposed within clarification chamber 68L. The lower terminal end of the sludge removal pipe 104 is disposed adjacent the bottom of the chamber 68L and the upper portion of pipe 104 communicates by means of a T 106 with pipe segments 108 and 110 having valves 112 and 114 disposed therein respectively.

The liquid level within each of the clarification chambers assumes the liquid level within the aeration basin by virtue of the horizontal opening 70 disposed in each clarification chamber wall. Upon entering the chamber, the floc and other solids tend to settle, forming a more compact sludge composition which settles to the chamber bottom. The sludge is continuously returned (until removal from the system is desired) to the aeration basin through the pipe 104 as a result of the action of air, entering from line 102 and jetting upwardly into pipe 104. The sludge is then forced into pipe 108 which discharges into the aeration basin. For this latter operation, valve 114 will be closed and valve 112 will be open. An air lift pump assembly as above described is disposed in each of the three clarification chambers.

The surface settling rate in the clarification chambers and the retention time of the chamber contents are of some importance in the design of the apparatus 10. State and local regulations will generally dictate the settling rate deemed necessary for proper solids removal in an aeration basin of the type described. An average surface settling rate of 500–600 gallons per square foot of clarification chamber surface area per day has been found satisfactory for domestic sewage treatment.

The average retention time of the clarification chamber contents is important as too long a retention time will result in the exhaustion of the oxygen therein. Since the chamber contents are cut off from the oxygen supplied to the basin contents, if retained for an excessive period of time anaerobic digestion or denitrification of the contents will result, both of which are undesired.

Extended aeration in the basin will cause excess nitrogen to be oxidized to nitrates. This nitrate oxygen will be consumed in the clarification chambers after exhaustion of the dissolved oxygen by the active microbial masses contained therein, releasing nitrogen gas which causes the sludge to rise to the chamber surface and be discharged in a liquid effluent. An average retention time of one to two hours of the clarification chamber contents has been found satisfactory.

Upon being recycled to the aeration basin, the agitation of the rotors 24 and 36 will redistribute the sludge in the mixed liquor within the aeration basin, reaerating the same and thus allowing a large build-up of suspended solids in the system without deleterious effects.

Since the process of redistributing and recycling is a continuous one, the system herein described is substantially unaffected by a large increase in sewage flow since the incoming raw sewage is immediately uniformly distributed throughout the aeration basin. The large active microbial masses distributed throughout the aerating chamber may immediately begin their digestive operation without experiencing any type of shock reaction which would alter or deleteriously affect the normal treating process. The active microbial masses have a normal concentration of about 600 milligrams per liter. The concentration will vary as the sewage flow varies during the day.

Grease and oil skimmer

Also disposed in each clarification chamber is an air supply conduit, such as conduit 118, see FIG. 2, connected to an air compressor (not shown). Conduit 118 enters a vertically disposed pipe 120 comprising a portion of a pumping system for recycling grease, fats, oils and similar substances which are skimmed from the upper surface of the clarification chamber contents by means of conical skimmer 122 having a rim disposed slightly below the normal liquid level. The latter skimmer and connected piping are supported by means of transverse angle irons 123 extending from basin wall 12 to which secured, as shown in FIG. 2. Rods 125 supported by members 123 in turn supportably engage rim portions of the skimmer 122.

The skimmed substances pass by means of vertical pipe 124 and horizontally disposed connector 126 to vertical pipe 120 which in turn connects with horizontal discharge pipe 128 emptying ntio the aeration basin. By continuous recycling the skimmed grease, fats and oils tend to be broken down and become emulsified. Thus, oil and grease are recycled which are originally mechanically attached to other solid particles in the incoming raw sewage. The skimmed substances may be processed so that the same in no way hinder the normal aerobic digestion taking place in chamber 38.

Effluent launder

Also disposed in clarification chamber 68L is a launder section, or trough, 130, for receiving the upper surface portion, or supernatant, from which the suspended solids have settled, see FIG. 2. Similar launder sections 130a are disposed in clarification chambers 68C and 68R. FIG. 8 illustrates the launder sections of chamber 68R; no pumping or other apparatus normally contained in the clarification chambers is depicted in this figure. FIG. 7 illustrates the launder sections of chamber 68C, together with a floc removing device and modified skimmer construction. Only a portion of the apparatus normally contained in each clarification chamber is illustrated in FIG. 7.

Launder sections 130 and 130a have vertical wall portions 132 and 132a, respectively. The latter walls have affixed thereto adjustable weir plates 129 which in turn have V-shaped notches 134 disposed therein at spaced intervals which preferably traverse the liquid level within the clarification chamber with which employed. Plates 129 are slotted at 145, see FIG. 9, at spaced intervals for passage of bolts 161 which cooperate with nuts (not illustrated) for retaining plates 129 in desired position relative to the edges of walls 132 and 132a with which employed. The latter construction is most apparent from FIG. 9, which illustrates a launder section 130a. Gaskets (not illustrated) may be employed to assure a fluid seal between bolts 161 and the launder bolt openings.

Also disposed in clarification chambers 68C and 68R are launder sections 131 disposed adjacent wall slot openings 70, as illustrated in FIGS. 7 and 8. As seen from FIG. 1, launder sections 136 disposed exteriorly of the clarification chambers interconnect the launder sections within the three clarification chambers. Upper edges 135 and 135a of vertical wall portions 137 and 137a of the launder sections 136 and 131, respectively, are elevated a sufficient distance above the normal liquid level within the aeration basin and clarification chambers (see FIGS. 2, 7 and 8) to prevent flow thereover of the adjacent liquor.

All of the launder sections have bottoms which are sloped toward an effluent line 138 which discharges the combined liquid effluent from all three clarification chambers into a stream or other body adapted to dispose of the effluent. The launder sections may be welded at 153 (see FIG. 8) or otherwise suitably affixed to shell 12. The launder sections are normally installed with the erection of wall 12 regardless of the initial use to be made of the basin 38. Clarification chamber walls 69 and angle portions 98a are appropriately cut out to permit passage therethrough of the various launder sections, as indicated at 159 in FIG. 7.

As a result of the aerobic digestion within the aeration basin, and as a result of the settling of the suspended solids in the clarification chambers, the liquid effluents entering launder sections 130 and 130a have a low biochemical oxygen demand which is readily dissipated in the stream into which discharged. A polishing pond may receive the effluent from line 138 for removing the slight biochemical oxygen demand remaining in such effluent prior to flowing into a stream for ultimate disposal.

State and local health regulations will determine the quantity, or pounds, of biochemical oxygen demand contained in the liquid effluent from a treating system such as is illustrated in FIG. 1, which may be discharged per unit time into a receiving stream. It is apparent that the quantity, or pounds, of biochemical oxygen demand which may be discharged into a receiving stream is dependent upon the size of such stream.

Launder section 130 terminates at a predetermined distance from the baffled opening 70 in the settling chamber 68L so that there is no possibility whatsoever of the mixed liquor from the aeration basin passing directly into the launder section 130. Since the clarification chamber 68L of FIG. 1 (illustrated in detail in FIG. 2) is disposed closer to effluent line 138 than to chamber opening 70, no launder section 131 is necessary. However, in clarification chamber 68R of FIG. 8, launder section 131 is essential to space launder section 130a from the inlet 70 and convey liquid effluent to discharge line 138.

In the central clarification chamber 68C illustrated in FIG. 7, launder section 131 is essential to transfer the effluent from the clarification chamber 68L to effluent line 138. Launder sections 131 and 136 may be eliminated if separate discharge conduits are employed which connect each section 130 and 130a with a collection point exteriorly disposed of the basin. Local health regulations will normally dictate the minimum distance between the launder sections 130 or 130a and the baffled opening 70. The baffles 94 also assist in obviating the possibility of the mixed liquor "short-circuiting" or passing directly from the aeration basin into launder sections 130 or 130a.

The length of the weirs in launder sections 130 and 130a disposed within the clarification chambers is determined by the following. The effluent flow rate should not be so great as to result in short circuiting across the chamber. A maximum flow rate of 10,000 gallons per linear foot per day is specified by most state regulations. Also, the flow rate preferably should not drop below 4,000–5,000 gallons per linear foot per day to provide a self-cleaning action on the weirs.

Floc separation

As previously noted, the rotors 24 and 36 rotate in a clockwise direction. Accordingly, the current imparted to the mixed liquor in the aeration basin similarly rotates in a clockwise direction. The settling chambers being in the path of a portion of this generated current, oppose the flow of the same. To assist in the separation of the light floc, comprising products of digestion of the organic content of the initial raw sewage, from the heavier raw sewage particles, the opening 70 disposed in the wall 69 of each clarification chamber is disposed in the portion of the chamber wall out of direct contact with the mixed liquor current generated in the aeration basin. Thus, opening 70 of each chamber is disposed in the right portion of wall 69 thereof when viewed from the basin center, as clearly seen from FIG. 1.

As a result of such slot location, the heavier unoxidized solids in the mixed liquor will tend to be driven past the clarification chambers and remain in the aeration basin. The light flocculent residue resulting from aerobic digestion of the raw sewage, however, will more readily enter the clarification chambers through the openings 70 by means of eddy currents generated adjacent each chamber wall 69.

It is seen, therefore, that the novel arrangement of the clarification chambers and the openings therein facilitate the desired sludge formation and removal in the illustrated system. The sludge is formed while the heavier unmetabolized organic components the raw sewage are forced to remain in the aeration basin until the same have been digested and reduced to a lighter form.

The clarification chambers are preferably constructed so that walls 69 are contiguous with portions of the basin wall 12. However, the chambers may also accomplish their intended purposes if spaced from the wall 12 defining discrete enclosures, and if they possess the necessary described apparatus and opening location relative to the mixed liquor current. The number of clarification chambers may vary between one and as many as may be properly maintained.

Figure 3:
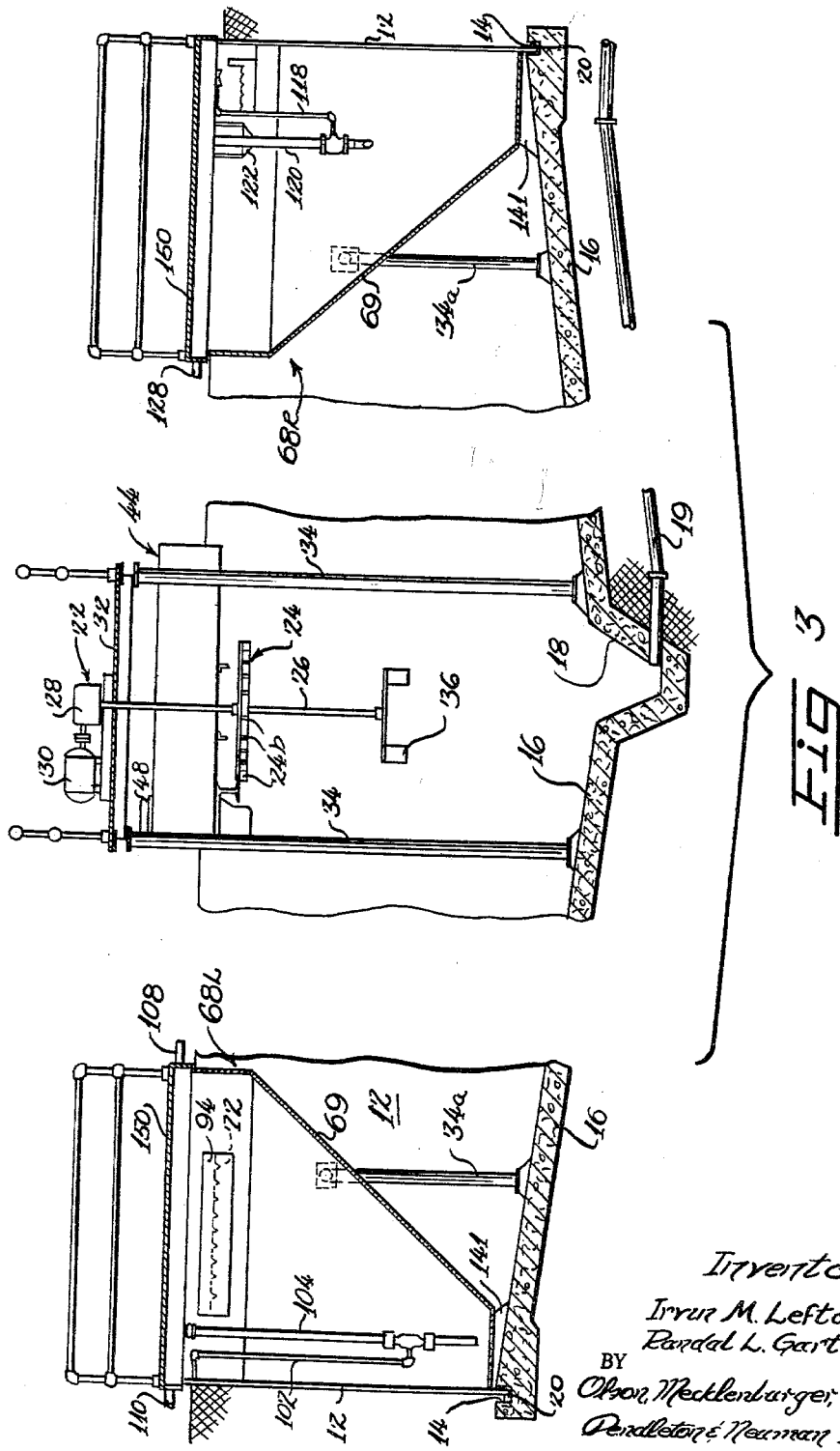
FIG. 3 is a fragmentary transverse sectional view of the apparatus assembly of FIG. 1 illustrated on a scale enlarged thereover, and depicting some of the apparatus components in elevation.

It will be noted from FIGS. 2 and 3 that grout 141 is disposed at the junctures between the cement floor 16 of the aeration basin and the vertical and inclined wall portions of each clarification chamber. The grout prevents the formation of recesses and dead spots wherein organic material may accumulate and undesired anaerobic digestion or denitrification may begin in addition to forming a seal for the bottom edge of chamber wall 69.

Sludge removal

The sludge forming on the bottom of each clarification chamber essentially comprises compacted floc. Whereas the solids concentration in the aeration basin may normally be less than 5,000 milligrams per liter, the sludge in the bottom of each settling chamber will have a solids concentration of 10,000 to 20,000 milligrams per liter. After the solids concentration in the mixed liquor within the aeration basin has risen to the extent that solids removal is usually desirable (about 4,000 to 5,000 milligrams per liter), the air lift pump disposed in one or more of the settling chambers may discharge the solids to a truck or other point of disposal exteriorly disposed of the aerating chamber. During this latter operation, valve 112 will be closed and valve 114 open (see FIG. 2).

It will be noted from FIG. 1 that the air lift pump recycles the sludge material into the aeration basin above the liquid level so that the color of the sludge may be readily ascertained. Improper functioning within any clarification chamber is indicated if the recycling sludge material does not have the normal color which is present under proper operating conditions.

The provided apparatus is substantially automatic in operation. Even should an attendant be absent for removing the sludge at periodic intervals from clarification chambers, the continuous recycling of the sludge into the aeration basin will maintain an aerobic condition. Increased suspended solids in the mixed liquor will saturate the mixed liquor, prevent complete solids separation in the clarification chambers and increase the discharge of solids in the effluent entering the launder sections 130 and 130a. Thus, excess solids will automatically be removed in the effluent stream if care is not taken to periodically remove the sludge in the clarification chambers to the basin exterior by means of the air lift pumps. Wasting of the suspended solids into the liquid effluent is not objectionable so long as the receiving stream is able to dissipate satisfactorily the biochemical oxygen demand in the effluent and the murky color of the effluent is not objectionabe in the receiving body of water.

Thus, the provided apparatus requires a minimum of maintenance and is substantially completely automatic in operation. An unskilled attendant need spend only a very limited amount of time at the installation. Simple quantitative analysis procedures will determine whether the suspended solids content of the mixed liquor is sufficiently high to require sludge removal.

Floc removing device

FIG. 7 illustrates a device in clarification chamber 68C for removal of the floc which would normally collect on the inclined surfaces of the clarification chamber wall 69. The latter device comprises a vertical rotatable shaft 140 engaging a bearing 142 at the lower end limit and a bearing 144 at an upper end portion. Arm 147a secured to wall 12 spaces the bearing 142 about a foot from the bottom of the chamber; the sludge is most concentrated in the latter chamber portion and it is preferred that the shaft 140 be spaced above the chamber bottom portion so as not to agitate the sludge therein. Upper bearing 144 is supported by an arm 147 secured to the wall 12. Attached to an upper portion of vertical shaft 140 is a horizontal arm 146, to which is attached at the distal end limit thereof an elongate chain 148 which is of sufficient length so as to extend to the bottom of the clarification chamber wall 69.

In the normal course of operation, an attendant may periodically move onto the platform 150 disposed over settling chamber 68C and place a handle 152, illustrated in dotted lines in FIG. 8, or other equivalent driving means over the end limit of shaft 140. The latter shaft may have a terminal end of reduced dimensions protruding through opening 154 disposed in platform 150 for interlocking with handle 152. By moving chain 148 over the inclined surface portion of wall 69, any adhering floc is disengaged from the wall and settles to the bottom, whereat an air lift pump (not illustrated in FIG. 7) may recycle the same to the aeration basin. The latter "deflocing" operation may be effected automatically at desired intervals by a motive means (not shown) which may periodically oscillate driving shaft 140. The deflocing apparatus may, of course, be employed in chambers 68L and 68R, as well as chamber 68C.

FIG. 8 also illustrates a modified skimmer construction 91 which is elongate and rectangular in configuration and disposed in front of vertical baffle 93 secured by spaced plates 95 (only one of which is illustrated) to launder section 130a. The skimmer may be secured to baffle 93 by suitable means. Baffle 93 and plates 95 define in part an open-bottom box having sides protruding both above and below the liquid level. Liquid entering the launder 130a must flow under baffle 93 and plates 95. Grease and oil tending to accumulate in front of baffle 93 wil pass into skimmer 91. The small area taken up by the narrow skimmer 91 will also enable deflocing chain 148 to move through a desired arc.

Inorganic particle removal

In addition to the organic content, raw sewage contains a certain amount of heavy inorganic material which settles out and is moved to central sump 18, more clearly seen in FIG. 3, in the normal aeration process. Such materials, for example, may include sand and eggshells. The inert material which gradually moves into center sump 18 is force through conduit 19 by pump means (not shown) to a point exteriorly disposed of the illustrated apparatus for ultimate disposal.

The size of the aeration basin may be readily calculated. If intended to process domestic sewage the basin size will be determined by the number of homes or persons to be served, each home or person being allocated a predetermined number of gallons of sewage per day. Similarly, a basin adapted to receive certain industrial wastes will have a size conforming to the maximum volume expected in the twenty-four hour retention period for which the provided apparatus is intended. The basin volume exclusive of the clarification chamber volume should be adequate to receive the daily sewage flow.

Another factor which must be considered to satisfy many state standards is the biochemical oxygen demand loading per 1,000 cubic feet of aeration basin volume. Most states have set a maximum loading of thirty-five pounds per 1,000 cubic feet. Since domestic sewage normally does not exceed a loading of twenty-two pounds per 1,000 cubic feet of basin volume, such maximum loading requirement does not present a problem and the maximum sewage volume expected in the twenty-four hour retention period is the sole criterion. However, assuming that the biochemical oxygen demand of industrial waste exceeded thirty-five pounds per 1,000 cubic feet of basin volume, additional basin volume and processing time must be provided. Thus, a waste containing forty-four pounds of biochemical oxygen demand necessitates the utilization of 44/35 of the 1,000 cubic feet or 1,257 cubic feet of aeration basin volume. Similarly, the twenty-four hour aeration time must be extended to 44/35 of twenty-four hours or thirty hours.

The numer of homes or individuals served by the above-described apparatus will of course be indicative of the quantity of biochemical oxygen demand, which will in turn determine the size of the aerator assembly components to supply the needed oxygen. Known aerator devices of the type described may dissolve approximately four pounds of oxygen per horsepower, per hour, into the agitated basin contents under normal operating conditions. The desired average settling rate and the desired average clarification chamber retention time of the sewage being processed will assist in determining the size and number of clarification chambers to be used.

By way of example, a tank fifty-eight feet in diameter may handle a daily sewage flow of 175,000 gallons emanating from a community of 500 homes. Each of the clarification chambers disposed therein has an upper radius of ten feet and a liquid contents depth of nine feet. The interval between the clarification chamber effluent-receiving launder section and wall opening should not be less than ten feet.

A ten horsepower motor will provide adequate motive power to rotor members for circulating the tank contents and forcing the necessary atmospheric oxygen to support aerobic digestion into the sewage. A rotor plate four and one-half feet in diameter disposed about five inches below the liquid level will function satisfactorily for aerating the sewage flow presented by way of example. The depth of the rotor plate below the basin liquid level is of some importance as the proper depth location assures continuous mixture of the entire basin contents. In this connection it will be appreciated that the openings 70 in the clarification chamber walls should be sufficiently large so that an adequate volume of basin mixed liquor will flow into the clarification chamber during peak sewage flow into the basin. Thus, the liquid level in the basin will not rise sufficiently to deleteriously affect the rotor plate efficiency.

Normally, the sludge is recycled from each chamber into the aeration basin at the same average rate at which the basin liquor flows into such chamber. Each chamber opening 70 should be sufficiently large, therefore, to receive both the average recycled volume from the chamber, plus its proportionate share of the maximum flow into the chamber thereby preventing a rise in the basin liquid level.

By way of example, a tank processing an average daily sewage flow of 108,000 gallons will produce an average flow into each of three clarification chambers of 25 gallons per minute. The sludge is preferably recycled from the bottom of each chamber into the aeration basin at the same rate of 25 gallons per minute. During the daily period of peak sewage flow, the share of the incoming sewage flow for each chamber will be 63 gallons per minute. The openings 70 should, therefore, be sufficiently large to receive 88 gallons per minute to prevent a rise in the basin liquid level.

The foregoing examples are based on the treatment of normal domestic sewage. Obviously, allowances must be made for the sewage strength in utilization of the provided apparatus. Industrial wastes may have a much greater or smaller biochemical oxygen demand than domestic sewage. In view of the foregoing description, individuals skilled in the art may readily embody the previously described inventive principles in apparatus adapted to biologically oxidize sewage, regardless of the specific nature of such sewage.

It is seen, therefore, that sewage treating apparatus has been provided which reduces the biochemical oxygen demand therein approximately ninety percent. Both aeration and clarification take place within the confines of the basin wall 12. The latter wall serves not only as an aeration basin wall but, in addition, segments thereof may also function as wall portions for the various clarification chambers disposed about the basin perimeter.

The provided apparatus functions in a substantially automatic manner and only a periodic check by an unskilled attendant is necessary to maintain the apparatus at peak efficiency. The provided aeration basin may be used in stages. It is adaptable for use solely as an aeration basin in combination with a stabilization pond. When larger loads of biochemical oxygen demand are imposed upon the provided apparatus, or the pond area needed for other purposes, the clarification chambers may be installed and the biochemical oxygen demand reduced to a desired level within the aeration basin wall 12.

The sludge formed as a result of the sewage oxidation is positively controlled at all times. The same may be recycled into the aeration basin from the clarification chambers until discharged from the basin into a tank truck or other means for ultimate disposal. The sludge may be dewatered and dried for use as fertilizer.

It should be further appreciated that the main apparatus elements may be dismantled and removed to a new site for reuse once permanent sewage facilities have been installed. The provided sewage apparatus may thus be reused in a plurality of sites.

The provided apparatus may function over broad temperature ranges. Although aerobic biological activity decreases with lower temperatures, the amount of oxygen retainable by liquid sewage increases with decreasing temperatures. In addition, objectionable reactions taking place in the sewage, as well as desired biological digestive reactions, are also limited at low temperatures. As a result, the provided process is substantially unaffected by temperature variation.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. In apparatus for the extended aeration of a solution of flowable waste material having a content which is biologically oxidizable, the combination comprising first means for receiving such flowable waste to be aerated, means disposed in said first means for creating a current of the flowable waste solution in said first means along a current path moving about the current-creating means in substantially a horizontal plane, at least one clarification chamber disposed in said first means having a first wall portion disposed in said current path and a lee wall portion spaced from the first wall portion and out of contact with the waste solution current, said lee wall portion having an opening at substantially the normal waste level in said first means for permitting passage of the waste solution into said clarification chamber.

2. The apparatus of claim 1 in combination with means disposed in said first means for diffusing oxygen into said waste solution in the vicinity of the current-creating means.

3. The apparatus of claim 1 in combination with means for discharging the contents of the bottom of each of said clarification chambers to a collection point exteriorly disposed of said first means.

4. The apparatus of claim 1 in combination with means disposed in the bottom of each of said clarification chambers and extending over said first means for con-continuously recycling the contents of the bottom of each of said clarification chambers into said first means.

5. In apparatus for the extended aeration of a solution of flowable waste material having a content which is biologically oxidizable, the combination comprising first means for receiving such flowable waste to be aerated, means disposed in said first means for creating a current of the flowable waste solution in said first means along a current path moving about the current-creating means in substantially a horizontal plane, at least one clarification chamber disposed in said first means on the perimeter thereof so as to be formed in part from said perimeter, said clarification chamber having a first wall portion connected to the perimeter of said first means disposed in said current path and a lee wall portion spaced from the first wall portion and out of contact with the waste solution current, said lee wall portion having an opening at substantially the normal waste level in said first means for permitting passage of the waste solution into said clarification chamber.

References Cited by the Examiner
UNITED STATES PATENTS

| | | | |
|---|---|---|---|
| 2,090,384 | 8/37 | Durdin | 210—197 |
| 2,323,437 | 7/43 | Yeomans et al. | 210—197 |
| 2,381,579 | 8/45 | Durdin | 210—201 |
| 2,429,315 | 10/47 | Green | 210—208 |
| 2,678,915 | 5/54 | Kalinske | 210—7 |
| 2,987,186 | 6/61 | Burgoon et al. | 210—15 X |
| 3,118,835 | 1/64 | Butler et al. | 210—15 X |

MORRIS O. WOLK, *Primary Examiner.*

EARL M. BERGERT, *Examiner.*